US008933919B2

(12) United States Patent
Son et al.

(10) Patent No.: US 8,933,919 B2
(45) Date of Patent: Jan. 13, 2015

(54) LIQUID CRYSTAL PANEL DRIVING CIRCUIT FOR DISPLAY STABILIZATION

(75) Inventors: Yeong-Joon Son, Daejeon-si (KR); Ji-Hun Kim, Daejeon-si (KR); Sang-Min Lee, Daejeon-si (KR); Joon-Ho Na, Daejeon-si (KR); Hae-Won Lee, Cheongju-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 324 days.

(21) Appl. No.: 13/461,317

(22) Filed: May 1, 2012

(65) Prior Publication Data

US 2012/0280961 A1 Nov. 8, 2012

(30) Foreign Application Priority Data

May 3, 2011 (KR) ........................ 10-2011-0041793
Feb. 13, 2012 (KR) ........................ 10-2012-0014467

(51) Int. Cl.
*G06F 3/038* (2013.01)
*G09G 3/36* (2006.01)

(52) U.S. Cl.
CPC ...... *G09G 3/3685* (2013.01); *G09G 2310/0248* (2013.01); *G09G 2310/0297* (2013.01); *G09G 2330/026* (2013.01); *G09G 2330/027* (2013.01)
USPC ........................................................ 345/211

(58) Field of Classification Search
USPC ........................................................ 345/211
See application file for complete search history.

(56) References Cited

U.S. PATENT DOCUMENTS

2006/0022929 A1 * 2/2006 Hashimoto et al. ............. 345/96

FOREIGN PATENT DOCUMENTS

| | | |
|---|---|---|
| JP | 2000-002866 | 1/2000 |
| KR | 10-2007-0002544 | 1/2007 |
| KR | 10-2010-0028677 A | 3/2010 |
| KR | 10-2011-0094967 | 8/2011 |

* cited by examiner

*Primary Examiner* — Robin Mishler
(74) *Attorney, Agent, or Firm* — Kile Park Reed & Houtteman PLLC

(57) ABSTRACT

Disclosed is a liquid crystal panel driving circuit of display stabilization, including: a plurality of output buffers buffering data voltage and supplying or cutting off the buffered data voltage to or from each of the plurality of data lines; an output MUX switch receiving outputs from two adjacent output buffers of the plurality of output buffers and transferring one of the two outputs to the plurality of data lines; a garbage switch connecting each of the plurality of data lines to a ground terminal; and a power on sensor or a power off sensor generating a power on or off reset signal in response to a turn on/off of a power supply voltage, wherein the output MUX switch is turned-off and the charge share switch and the garbage switch are turned-on, in response to the power on reset signal or the power off reset signal.

12 Claims, 5 Drawing Sheets

LIQUID CRYSTAL PANEL DRIVING CIRCUIT FOR DISPLAY STABILIZATION

BACKGROUND OF THE INVENTION

1. Field of the Invention

The present invention relates to a liquid crystal panel driving circuit, and more particularly, to a liquid crystal panel driving circuit for display stabilization capable of removing a display abnormal phenomenon by preventing static current from flowing in source drivers during a garbage processing operation.

2. Description of the Related Art

Recently a flat panel display as an image display device used for a monitor of mobile terminals and various information devices, and the like, has been prevalently used. An example of the flat panel display may include a liquid crystal display, a light emitting display, a plasma display panel, and the like.

Among others, the liquid crystal display displays an image by controlling light transmittance of a liquid crystal using electric field. To this end, the liquid crystal display includes a plurality of pixel cells, a liquid crystal panel for displaying an image, and a driving circuit for driving the liquid crystal panel.

In the liquid crystal panel, a plurality of gate lines and a plurality of data line are arranged so as to intersect each other and the pixel cells are disposed in a region in which the gate lines and the data line are defined so as to vertically intersect each other. Further, pixel electrodes and common electrodes are formed so as to apply electric field to each pixel cell. Each pixel electrode is connected to a thin film transistor (TFT) that is a switching element. The TFT is turned-on by scan pulses of the gate lines to charge data signals from the data lines in the pixel electrodes.

The driving circuit includes gate drivers for driving the gate lines, source drivers for driving the data lines, and a timing controller supplying control signals for controlling the gate drivers and the source drivers.

In this configuration, the source drivers convert image data from the timing controller into analog image signals and then, select data voltage having a predetermined level according to gray scales of the analog image signals. Further, the selected data voltage is supplied to each of the data lines.

However, the existing liquid crystal display outputs unexpected signals from the source drivers at the time of initial power on/off, which results in displaying unintended image data on the liquid crystal panel.

SUMMARY OF THE INVENTION

Accordingly, the present invention has been made in an effort to solve the problems occurring in the related art, and an object of the present invention is to provide a liquid crystal panel driving circuit for display stabilization capable of realizing display stabilization at the time of power on/off by making outputs from mode source drivers into ground voltage levels at the time of initial power on/off and removing a display abnormal phenomenon by cutting off power input to an output buffer during a garbage processing operation so as to prevent static current from flowing in source drivers.

In order to achieve the above object, according to one aspect of the present invention, there is provided a liquid crystal panel driving circuit of display stabilization, including: a plurality of output buffers buffering data voltage and supplying or cutting off the buffered data voltage to or from each of the plurality of data lines; an output MUX switch receiving outputs from two adjacent output buffers of the plurality of output buffers and transferring one of the two outputs to one of the plurality of data lines; a garbage switch connecting each of the plurality of data lines to a ground terminal; and a power on sensor generating a power on reset signal in response to a turn on of a power supply voltage, wherein the output MUX switch is turned-off and the garbage switch is turned-on, in response to the power on reset signal.

In order to achieve the above object, according to another aspect of the present invention, there is provided a liquid crystal panel driving circuit of display stabilization, including: a plurality of output buffers buffering data voltage and supplying or cutting off the buffered data voltage to or from each of the plurality of data lines; an output MUX switch receiving outputs from two adjacent output buffers of the plurality of output buffers and transferring one of the two outputs to one of the plurality of data lines; a garbage switch connecting each of the plurality of data lines to a ground terminal; and a power off sensor generating a power off reset signal in response to a turn off of a power supply voltage, wherein the output MUX switch is turned-off and the garbage switch is turned-on, in response to the power off reset signal.

In order to achieve the above object, according to still another aspect of the present invention, there is provided a liquid crystal panel driving circuit for display stabilization, including: a plurality of output buffers buffering data voltage and supplying or cutting off the buffered data voltage to or from each of the plurality of data lines; an output MUX switch receiving outputs from two adjacent output buffers of the plurality of output buffers and transferring one of the two outputs to one of the plurality of data lines; a charge share switch connecting the two adjacent data lines of the plurality of data lines; a power on sensor generating a power on reset signal in response to a turn on of a power supply voltage; a power off sensor generating a power off reset signal in response to a turn off of a power supply voltage; and a power switch disposed on a power supply line supplying power to the output buffers and switching power supply to the output buffers, wherein the power switch and the output MUX switch are turned-off in response to the power on reset signal or the power off reset signal.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
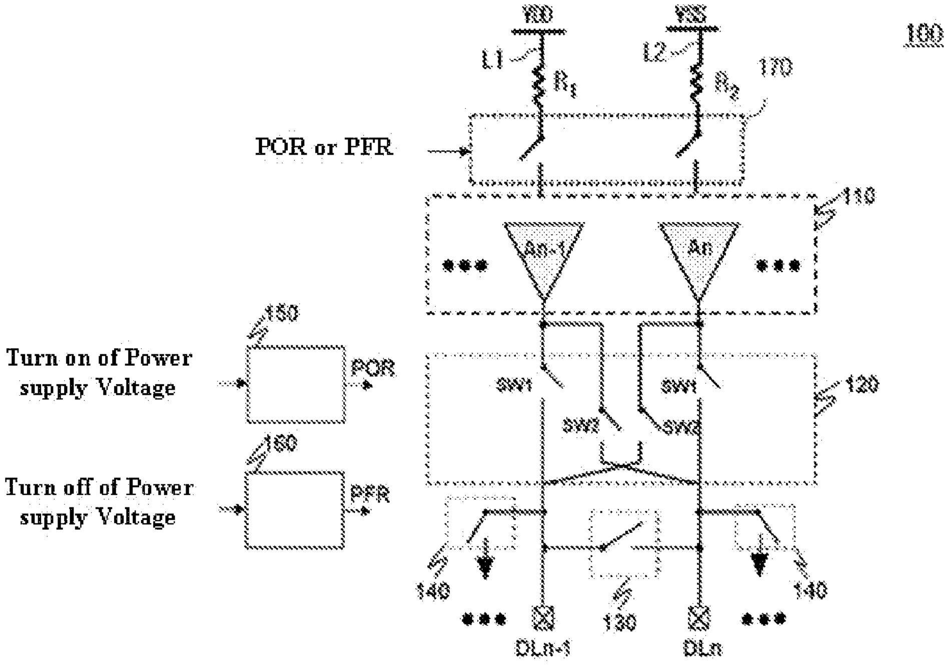
FIG. 1 is a diagram schematically illustrating a liquid crystal panel driving circuit for display stabilization in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Hereinafter, detailed embodiments of the present invention will be described in detail with reference to the accompanying drawings.

FIG. 1 is a diagram schematically illustrating a liquid crystal panel driving circuit for display stabilization in accordance with an embodiment of the present invention.

Referring to FIG. 1, a liquid crystal panel driving circuit 100 for display stabilization in accordance with an embodiment of the present invention includes a plurality of output buffers 110, an output MUX switch 120, a charge share switch 130, a garbage switch 140, a power on sensor 150, and a power switch 170.

Meanwhile, the liquid crystal panel driving circuit 100 for display stabilization in accordance with another embodiment of the present invention includes the plurality of output buffers 110, the output MUX switch 120, the charge share switch 130, the garbage switch 140, a power off sensor 160, and the power switch 170.

The plurality of output buffers 110 buffers data voltage and supplies or cuts off the buffered data voltage to or from each of the plurality of data lines. The output MUX switch 120 receives outputs from two adjacent output buffers An−1 and An of the plurality of output buffers and transfers one of the outputs to one of two corresponding data lines DLn−1 and DLn from the plurality of data lines. Here, the output MUX switch 120 is operated by alternately switching a first switch SW1 and a second switch SW2 according to control signals.

The charge share switch 130 connects the two adjacent data lines DLn−1 and DLn to each other and the garbage switch 140 connects each of the data lines DLn−1 and DLn to a ground voltage source. The power on sensor 150 generates a power on reset (POR) signal in response to a turn on of a power supply voltage and the power off sensor 160 generates a power off reset (PFR) signal in response to a turn off of the power supply voltage.

The power switch 170 is turned-off in response to the power on reset (POR) signal or the power off reset (PFR) signal to cut off power input to the output buffer 110 during a garbage processing operation.

In the liquid crystal panel driving circuit 100 for display stabilization in accordance with the embodiment of the present invention, both of the first switch SW1 and the second switch SW2 configuring the output MUX switch 120 are turned-off in response to the POR signal of the power on sensor 150 or the PFR signal of the power off sensor 160 and the charge share switch 130 and the garbage switch 140 are turned-on. By this configuration, outputs from all the source drivers are transferred to ground voltage levels, thereby making it possible to stabilize a display at the time of power on/off.

Meanwhile, the power switch 170 of the liquid crystal panel driving circuit 100 for display stabilization in accordance with the embodiment of the present invention is turned-off in response to the power on reset (POR) signal of the power on sensor 150 or the power off reset (PFR) signal of the power off sensor 160 to cut off power VDD and VSS input to the output buffer 110, thereby preventing static current from flowing in the driving circuit including source drivers.

Therefore, it is possible to prevent the ground voltage levels applied to each source driver from changing due to resistance components R1 and R2 existing on power supply lines L1 and L2 between a PCB and the liquid crystal panel driving circuit and the static current flowing in the source drivers. Thereby, it is possible to remove a display abnormal phenomenon that may occur due to a difference in the ground voltage levels applied to each source driver at the time of the power on/off.

Figure 2:
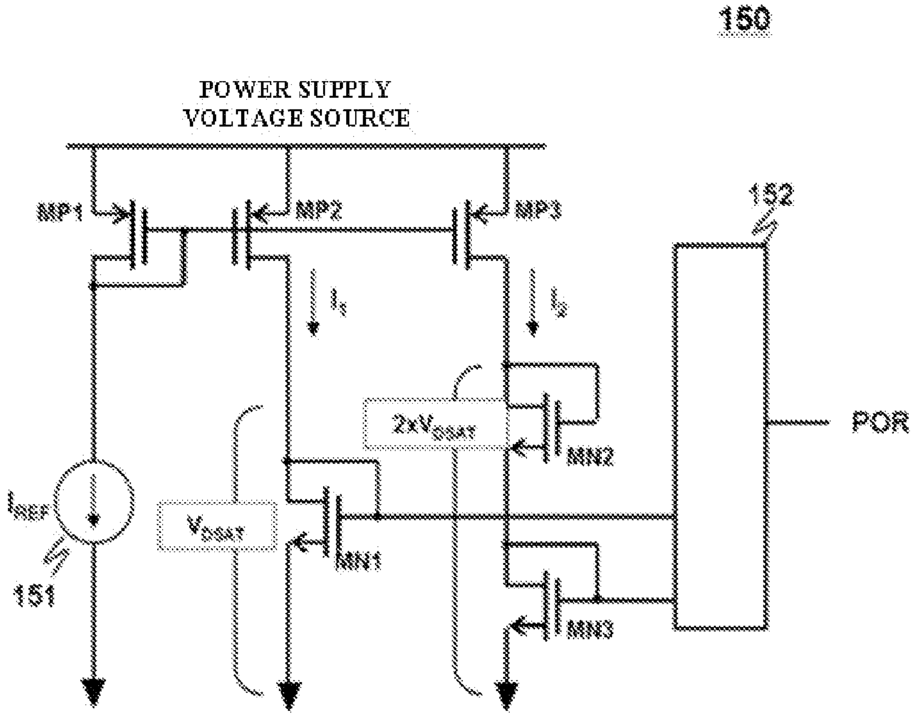
FIGS. 2 and 3 are a detailed circuit diagram of a power-on sensor of the liquid crystal panel driving circuit for display stabilization in accordance with an embodiment of the present invention and a diagram for describing an operation thereof.
Figure 3:
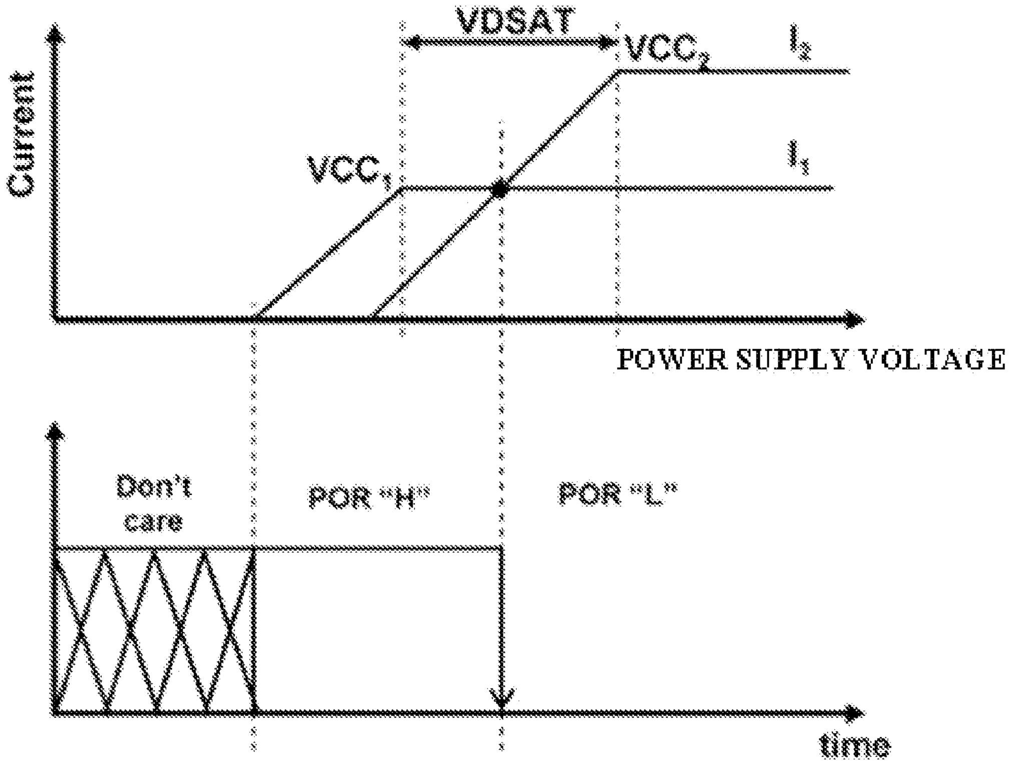

FIGS. 2 and 3 are a detailed circuit diagram of the power on sensor in accordance with the embodiment of the present invention and a diagram for describing an operation thereof.

Referring to FIG. 2, the power on sensor 150 in accordance with the embodiment of the present invention includes first to third MOS transistors MP1 to MP3, fourth to sixth MOS transistors MN1 to MN3, a current source 151, and a comparator 152.

A source of the first MOS transistor MP1 is connected to a power supply voltage and a gate and a drain thereof are connected to each other and one end of the current source 151 is connected to a drain of the first MOS transistor MP1 and the other end thereof is connected to the ground voltage source. A source of the second MOS transistor MP2 is connected to the power supply voltage and a gate thereof is connected to the gate of the first MOS transistor MP1 to form a first current mirror together with the first MOS transistor MP1. A drain and a gate of the fourth MOS transistor MN1 are connected to each other and are connected to the drain of the second MOS transistor MP2 and a source thereof is connected to the ground voltage source. A source of the third PMOS transistor MP3 is connected to the power supply voltage and a gate thereof is connected to the gate of the first MOS transistor MP1 to form a second current mirror together with the first MOS transistor MP1. A drain and a gate of the fifth MOS transistor MN2 are connected to each other and are connected to the drain of the third MOS transistor MP3 and a drain and a gate of the sixth MOS transistor MN3 are connected to each other and are connected a source of the fifth MOS transistor MN2 and a source thereof is connected to the ground voltage source. The comparator 152 compares first current I1 from the first current mirror with second current I2 from a second current mirror using gate voltage of the fourth MOS transistor MN1 and gate voltage of the sixth MOS transistor MN3.

Hereinafter, the operation of the power on sensor 150 illustrated in FIG. 2 will be described with reference to FIG. 3.

Referring to FIGS. 2 and 3, the power on sensor 150 in accordance with the embodiment of the present invention forms the first current mirror using the first MOS transistor MP1 and the second MOS transistor MP2 and forms the second current mirror using the first MOS transistor MP1 and the third MOS transistor MP3. Further, the current source 151 disposed between the drain of the first MOS transistor MP1 and the ground voltage source generates predetermined reference current IREF and the generated reference current IREF is replicated to the first current I1 from the first current mirror and the second current I2 from the second current mirror according to a ratio of the first to third MOS transistors MP1 to MP3. Here, it is preferable to determine the ratio of the first to third MOS transistors MP1 to MP3 so that the second current I2 is two times larger than the first current I1.

Further, the fourth to sixth MOS transistors MN1 to MN3 are the same transistors and when minimum sustain voltage of the fourth MOS transistor MN1 disposed on a path in which the first current I1 flows is set to be saturation drain voltage VDSAT, minimum sustain voltage of the second to sixth MOS transistors MN2 and MN3 disposed on a path in which the second current I2 flows is set to be two-times saturation drain voltage (2×VDSAT).

Therefore, as illustrated in FIG. 3, in the saturation state of the fourth to sixth MOS transistors MN1 to MN3, power supply voltage VCC2 supplying the second current I2 is larger than power supply voltage VCC1 supplying the first current I1 and therefore, the first current I1 becomes larger than the second current I2 in the initial state at the time of power on but the second current I2 becomes larger than the first current I1 in a normal operation state.

An example of the embodiment of the present invention senses a point at which the first current is equal to the second current by comparing the first current with the second current, thereby generating the POR signal. In FIG. 3, it is to be noted that the power on is sensed while the POR signal changing from logic high to logic low, and vice versa.

In FIG. 2, it is to be noted that the first to third MOS transistors MP1 to MP3 are a PMOS transistor and the fourth to sixth MOS transistors MN1 to MN3 is an NMOS transistor, and vice versa.

Meanwhile, when the POR signal is generated, the power switch 170 is turned-off and cuts off power input to the output buffer.

Figure 4:
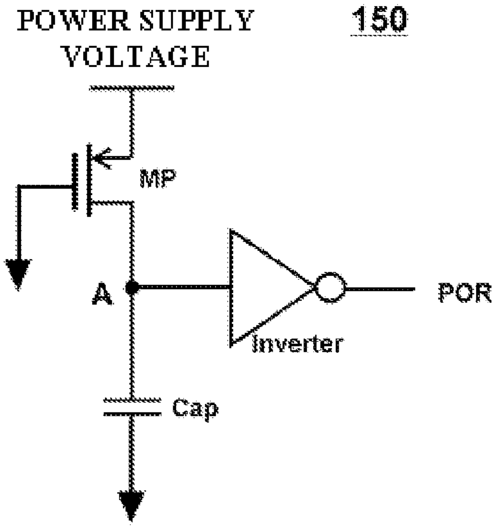
FIGS. 4 and 5 are a detailed circuit diagram of a power-on sensor of a liquid crystal panel driving circuit for display stabilization in accordance with another embodiment of the present invention and a diagram for describing an operation thereof.
Figure 5:
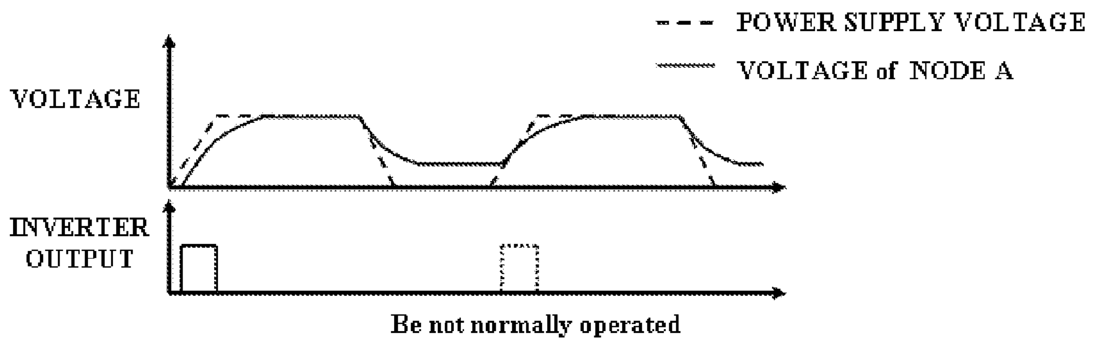

FIGS. 4 and 5 are a detailed circuit diagram of the power on sensor in accordance with another embodiment of the present invention and a diagram for describing an operation thereof.

Referring to FIG. 4, the power on sensor 150 in accordance with another embodiment of the present invention includes a PMOS transistor, a capacitor Cap, and an inverter.

A source of the PMOS transistor MP is connected to the power supply voltage and a gate thereof is connected to the power supply voltage and a first terminal of the capacitor Cap is connected to a drain of the PMOS transistor MP and a second terminal thereof is connected to the ground voltage source. The inverter inverts a voltage level of a first terminal A of the capacitor Cap to output the POR signal. In the specification, the first terminal of the capacitor Cap is referred to node A for convenience of explanation.

Hereinafter, an operation of the power on sensor 150 illustrated in FIG. 4 will be described below with reference to FIG. 5.

As illustrated in FIG. 5, the power on sensor 150 in accordance with another embodiment of the present invention senses that node voltage A is slower than rising time of the power supply voltage by turn-on voltage Vth of the PMOS transistor and on-resistance of the PMOS transistor MP, and RC delay due to the capacitor Cap.

Further, when a predetermined voltage difference between the power supply voltage and the node voltage A is present, the inverter outputs the POR signal. As illustrated in FIG. 5, in accordance with the embodiment of the present invention, when the predetermined voltage difference between the power supply voltage and the node voltage A is present, the inverter outputs the logic high and when the voltage difference between the power voltage and the node voltage A is a predetermined voltage difference or less, the inverter outputs the logic low.

However, as illustrated in FIG. 5, the power on sensor 150 in accordance with another embodiment of the present invention illustrated in FIG. 4 may discharge charges charged in the node A through the PMOS transistor MP when the power supply voltage is small at the time of power off but cannot discharge the charges of the node A by turning-off the PMOS transistor MP when the power supply voltage is smaller than the turn on voltage Vth of the PMOS transistor MP.

Therefore, the node A may have residual voltage even after the power off and in this state, when the node A is again powered-on, the effect due to the turn-on voltage Vth of the PMOS transistor MP and the RC delay is small, such that the inverter can continuously output only the logic low without outputting the logic high.

Figure 6:
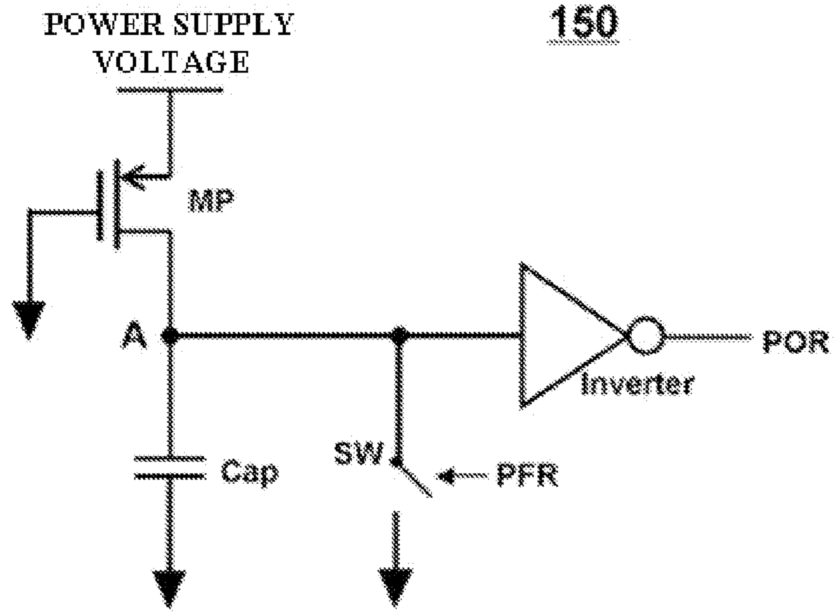
FIGS. 6 and 7 are a detailed circuit diagram of a power-on sensor of a liquid crystal panel driving circuit for display stabilization in accordance with another embodiment of the present invention and a diagram for describing an operation thereof.
Figure 7:
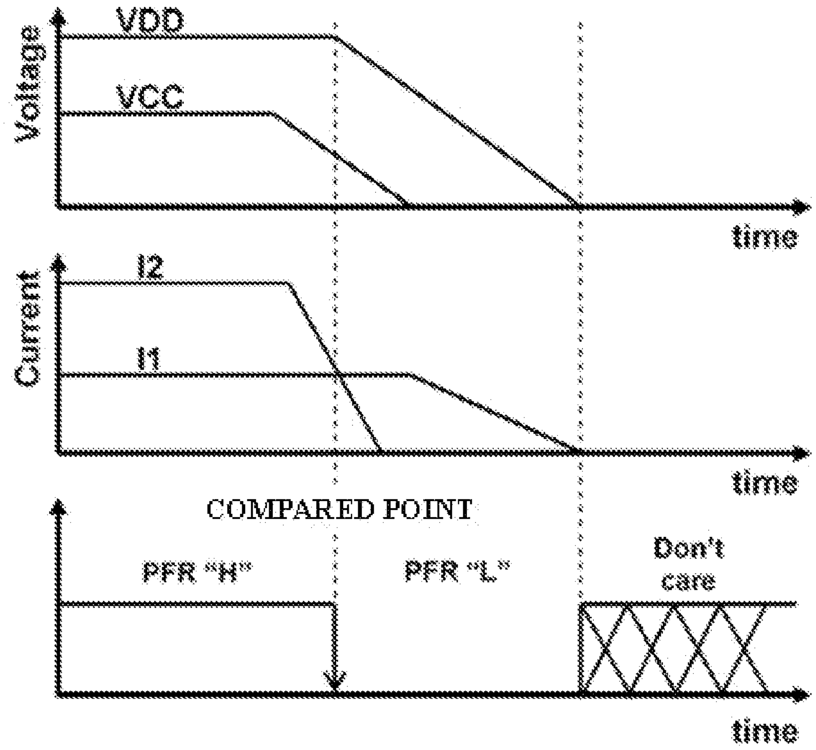

FIGS. 6 and 7 are a detailed circuit diagram of the power on sensor in accordance with another embodiment of the present invention and a diagram for describing an operation thereof. Here, the same components as the embodiment illustrated in FIG. 4 are denoted by the same reference numerals and therefore, the repeated description thereof will be omitted.

Referring to FIG. 6, the power on sensor 150 in accordance with another embodiment of the present invention further includes a switch SW for discharging the node voltage A between the node A and the ground voltage source so as to solve the problems of the problems of the embodiment illustrated in FIG. 4 as described above. The switch SW is controlled by the PFR signal generated from the power off sensor 160.

That is, the switch SW turned-on according to the PFR signal at the time of power off discharges the overall node voltage A and therefore, as illustrated in FIG. 7, the RC delay of the normal node voltage A occurs even at the time of next power on, thereby making it possible to prevent a malfunction due to the residual voltage of the node A.

Figure 8:
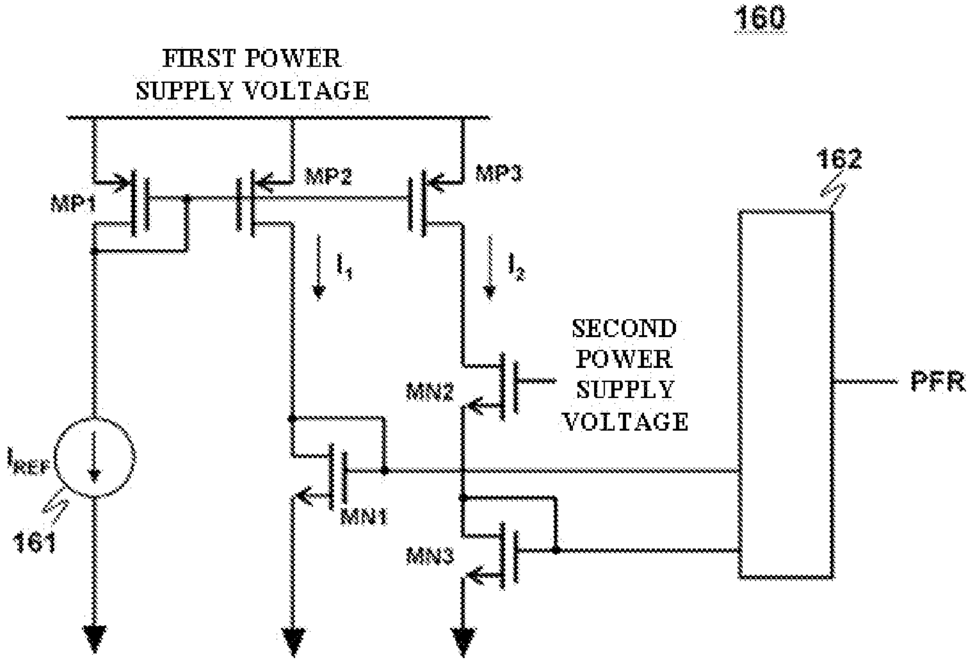
FIGS. 8 and 9 are a detailed circuit diagram of a power-off sensor of a liquid crystal panel driving circuit in accordance with another embodiment of the present invention and a diagram for describing an operation thereof.
Figure 9:
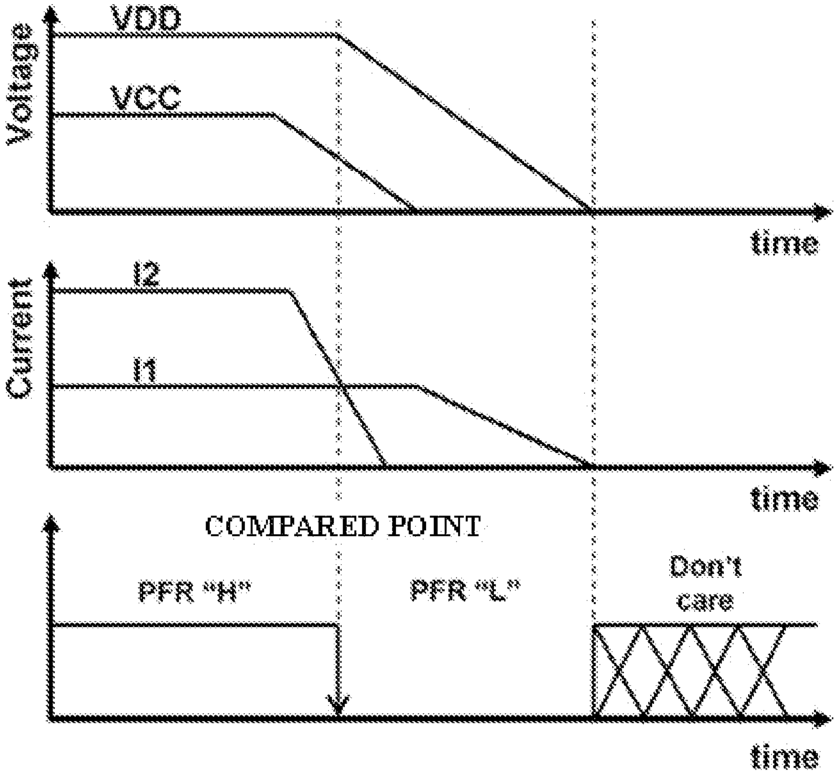

FIGS. 8 and 9 are a detailed circuit diagram of the power off sensor in accordance with another embodiment of the present invention and a diagram for describing an operation thereof.

Referring to FIG. 8, the power off sensor 160 in accordance with the embodiment of the present invention includes the first to third MOS transistors MP1 to MP3, the fourth to sixth MOS transistors MN1 to MN3, a current source 161, and a comparator 162.

The source of the first MOS transistor MP1 is connected to the first power supply voltage and the gate and the drain thereof are connected to each other and one end of the current source 161 is connected to the drain of the first MOS transistor MP1 and the other end thereof is connected to the ground voltage source. The source of the second MOS transistor MP2 is connected to the first power supply voltage and the gate thereof is connected to the gate of the first MOS transistor MP1 to form the first current mirror together with the first MOS transistor MP1. The drain and the gate of the fourth MOS transistor MN1 are connected to each other and are connected to the drain of the second MOS transistor MP2 and the source thereof is connected to the ground voltage source. The source of the third MOS transistor MP3 is connected to the first power supply voltage and the gate thereof is connected to the gate of the first MOS transistor MP1 to form the second current mirror together with the first MOS transistor MP1. The drain of the fifth MOS transistor MN2 is connected to the drain of the third MOS transistor MP3 and the gate thereof is applied with the second power supply voltage. The drain and the gate of the sixth MOS transistor MN3 are connected to each other and are connected to the source of the fifth MOS transistor MN2 and the source thereof is connected to the ground voltage source. The comparator 162 compares the first current I1 from the first current mirror with the second current I2 from the second current mirror using the gate voltage of the fourth MOS transistor MN1 and the gate voltage of the sixth MOS transistor MN3. Here, the first power supply voltage is high power supply voltage driving the source drivers and the second power supply voltage is power supply voltage driving the logic circuits of the source drivers.

Hereinafter, the operation of the power off sensor 160 illustrated in FIG. 8 will be described below with reference to FIG. 9.

Referring to FIGS. 8 and 9, the power off sensor 160 in accordance with the embodiment of the present invention forms the first current mirror using the first MOS transistor MP1 and the second MOS transistor MP2 and forms the second current mirror using the first MOS transistor MP1 and the third MOS transistor MP3. Further, the current source 161 disposed between the drain of the first MOS transistor MP1 and the ground voltage source generates the predetermined reference current IREF, wherein the generated reference current IREF is replicated to the first current I1 from the first current mirror and the second current I2 from the second current mirror according to the ratio of the first to third MOS transistors MP1 to MP3. Here, it is preferable to determine the ratio of the first to third MOS transistors MP1 to MP3 so that the second current I2 is two times larger than the first current.

Therefore, as illustrated in FIG. 9, the second current I2 becomes larger than the first current I1 in the normal operation state but when the second power supply voltage is low at the time of power off, the first current I1 becomes larger than the second current I2. The example of the embodiment of the present invention senses a point at which the first current is equal to the second current by comparing the first current with the second current, thereby generating the POR signal. In FIG. 9, it is to be noted that the power off is sensed while the PFR signal changing from logic high to logic low, and vice versa.

In FIG. 8, it is to be noted that the first to third MOS transistors MP1 to MP3 are a PMOS transistor and the fourth to sixth MOS transistors MN1 to MN3 is an NMOS transistor, and vice versa.

Meanwhile, when the PFR signal is generated, the power switch 170 is turned-off and cuts off power input to the output buffer.

As described above, the liquid crystal display for display stabilization in accordance with the embodiment of the present invention makes the outputs from the source drivers into the ground voltage levels at the time of initial power on/off by using the garbage processing method, thereby stabilizing the display at the time of initial power on/off.

In a chip on glass (hereinafter, referred to as COG), a printed circuit board (PCB) part is connected the source drivers by a line on glass (hereinafter, referred to as LOG) and the resistance components exist on the LOG.

Meanwhile, the outputs from all the source drivers are connected to the ground voltage (VSS) levels during the garbage processing operation. However, the static current flows in the source drivers during the garbage processing and the ground voltage (VSS) levels applied to the source drivers have a difference between the respective source drivers due to the resistance components existing on the LOG and the static current flowing in the source drivers.

Further, the embodiment of the present invention can remove the image abnormal phenomenon by preventing the ground voltage levels for each source driver from changing by cutting off the power input to the output buffers during the garbage processing operation to prevent the static current from flowing in the source drivers.

The embodiments of the present invention can prevent the unintended image data from being displayed on the liquid crystal panel by making the output from the source drivers into the ground voltage levels at the time of the initial power on/off.

Further, the embodiment of the present invention can remove the display abnormal phenomenon by preventing the ground voltage levels for each source driver from changing due to the resistance component existing on the LOG and the static current flowing in the source drivers by cutting off the power input to the output buffer during the garbage processing operation to prevent the static current from flowing in the source drivers.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A liquid crystal panel driving circuit of display stabilization, comprising:
- a plurality of output buffers buffering data voltage and supplying or cutting off the buffered data voltage to or from each of the plurality of data lines;
- an output MUX switch receiving outputs from two adjacent output buffers of the plurality of output buffers and transferring one of the two outputs to one of the plurality of data lines;
- a garbage switch connecting each of the plurality of data lines to a ground terminal; and
- a power on sensor generating a power on reset signal in response to a turn on of a power supply voltage,
- wherein the output MUX switch is turned-off and the garbage switch is turned-on, in response to the power on reset signal.

2. A liquid crystal panel driving circuit of display stabilization, comprising:
- a plurality of output buffers buffering data voltage and supplying or cutting off the buffered data voltage to or from each of the plurality of data lines;
- an output MUX switch receiving outputs from two adjacent output buffers of the plurality of output buffers and transferring one of the two outputs to one of the plurality of data lines;
- a garbage switch connecting each of the plurality of data lines to a ground terminal; and
- a power off sensor generating a power off reset signal in response to a turn off of a power supply voltage,
- wherein the output MUX switch is turned-off and the garbage switch is turned-on, in response to the power off reset signal.

3. The liquid crystal panel driving circuit of display stabilization of claim 1, further comprising: a charge share switch connecting the two adjacent data lines of the plurality of data lines,
- wherein the charge share switch is turned-on in response to the power on reset signal.

4. The liquid crystal panel driving circuit of display stabilization of claim 2, further comprising:
- further comprising: a charge share switch connecting the two adjacent data lines of the plurality of data lines,
- wherein the charge share switch is turned-on in response to the power off reset signal.

5. A liquid crystal panel driving circuit for display stabilization of claim 1, wherein the power on sensor includes:
- a first MOS transistor having a source connected to a power supply voltage and a gate and a drain connected to each other;
- a current source having one end connected to the drain of the first MOS transistor and the other end connected to a ground voltage source;
- a second MOS transistor having a source connected to the power supply voltage and a gate connected to the gate of the first MOS transistor to form a first current mirror together with the first MOS transistor;

a fourth MOS transistor having a drain and a gate connected to each other and connected to a drain of the second MOS transistor and having a source connected to a ground voltage source;

a third MOS transistor having a source connected to the power supply voltage and a gate connected to the gate of the first MOS transistor to form a second current mirror together with the first MOS transistor;

a fifth MOS transistor having a drain and a gate connected to each other and connected to the drain of the third MOS transistor;

a sixth MOS transistor having a drain and a gate connected to each other and connected to the source of the fifth MOS transistor and having a source connected to the ground voltage source; and a comparator comparing first current from the first current mirror and second current from the second current mirror using gate voltage of the fourth MOS transistor and gate voltage of the sixth MOS transistor.

6. The liquid crystal panel driving circuit for display stabilization of claim 5, wherein the second current from the second current mirror is larger than the first current from the first current mirror.

7. The liquid crystal panel driving circuit for display stabilization of claim 2, wherein the power off sensor includes:

a first MOS transistor having a source connected to a first power supply voltage and a gate and a drain connected to each other;

a current source having one end connected to the drain of the first MOS transistor and the other end connected to a ground voltage source;

a second MOS transistor having a source connected to the first power supply voltage and a gate connected to the gate of the first MOS transistor to form a first current mirror together with the first MOS transistor;

a fourth MOS transistor having a drain and a gate connected to each other and connected to a drain of the second MOS transistor and having a source connected to a ground voltage source;

a third MOS transistor having a source connected to the first power source voltage source and a gate connected to the gate of the first MOS transistor to form a second current mirror together with the first MOS transistor;

a fifth MOS transistor having a drain connected to the drain of the third MOS transistor and having a gate applied with second power supply voltage;

a sixth MOS transistor having a drain and a gate connected to each other and connected to the source of the fifth MOS transistor and having a source connected to the ground voltage source; and a comparator comparing first current from the first current mirror and second current from the second current mirror using gate voltage of the fourth MOS transistor and gate voltage of the sixth MOS transistor.

8. The liquid crystal panel driving circuit for display stabilization of claim 7, wherein the first power supply voltage is high power supply voltage driving source drivers and the second power supply voltage is power supply voltage driving logic circuits of source drivers.

9. The liquid crystal panel driving circuit for display stabilization of claim 8, wherein the second current from the second current mirror is larger than the first current from the first current mirror.

10. The liquid crystal panel driving circuit for display stabilization of claim 3, further comprising:

a power switch disposed on a power supply line supplying power to the output buffers and switching power supply to the output buffers, wherein the power switch is turned-off in response to the power on reset signal.

11. The liquid crystal panel driving circuit for display stabilization of claim 4, further comprising:

a power switch disposed on a power supply line supplying power to the output buffers and switching power supply to the output buffers, wherein the power switch is turned-off in response to the power off reset signal.

12. A liquid crystal panel driving circuit for display stabilization, comprising:

a plurality of output buffers buffering data voltage and supplying or cutting off the buffered data voltage to or from each of the plurality of data lines;

an output MUX switch receiving outputs from two adjacent output buffers of the plurality of output buffers and transferring one of the two outputs to one of the plurality of data lines;

a charge share switch connecting the two adjacent data lines of the plurality of data lines;

a power on sensor generating a power on reset signal in response to a turn on of a power supply voltage;

a power off sensor generating a power off reset signal in response to a turn off of a power supply voltage; and a power switch disposed on a power supply line supplying power to the output buffers and switching power supply to the output buffers, wherein the power switch and the output MUX switch are turned-off in response to the power on reset signal or the power off reset signal.

* * * * *